US012559973B2

(12) United States Patent
Viklund

(10) Patent No.: US 12,559,973 B2
(45) Date of Patent: Feb. 24, 2026

(54) PLUG FOR LOCK SYSTEM AND ASSOCIATED METHOD OF ASSEMBLY

(71) Applicant: dormakaba USA Inc., Indianapolis, IN (US)

(72) Inventor: Michael Viklund, Indianapolis, IN (US)

(73) Assignee: dormakaba USA Inc, Indianapolis, IN (US)

( * ) Notice: Subject to any disclaimer, the term of this patent is extended or adjusted under 35 U.S.C. 154(b) by 146 days.

(21) Appl. No.: 18/450,768

(22) Filed: Aug. 16, 2023

(65) Prior Publication Data

US 2025/0059797 A1 Feb. 20, 2025

(51) Int. Cl.
*E05B 27/00* (2006.01)
*E05B 17/00* (2006.01)

(52) U.S. Cl.
CPC ........ *E05B 27/006* (2013.01); *E05B 17/0004* (2013.01); *E05B 27/0007* (2013.01)

(58) Field of Classification Search
CPC .... E05B 27/00; E05B 27/006; E05B 17/0004; E05B 27/0007; Y10T 70/7599; Y10T 70/7672
USPC ........................................................... 70/491
See application file for complete search history.

(56) References Cited

U.S. PATENT DOCUMENTS 2,059,678 A 11/1936 Briggs
3,485,068 A 12/1969 Bernard
3,505,842 A 4/1970 William
3,599,455 A 8/1971 Pilvet
3,968,668 A 7/1976 Epstein
4,064,720 A 12/1977 Fry
4,424,693 A 1/1984 Best et al.
4,715,201 A 12/1987 Craig
(Continued)

FOREIGN PATENT DOCUMENTS

CN 101010474 A * 8/2007 ......... E05B 29/0066
CN 103459739 B * 2/2016 ........... E05B 27/005
(Continued)

OTHER PUBLICATIONS

Espacenet machine translation of DE 507106 C, generated Apr. 18, 2024. (Year: 2024).
(Continued)

*Primary Examiner* — Suzanne L Barrett
(74) *Attorney, Agent, or Firm* — Faegre Drinker Biddle & Reath LLP

(57) ABSTRACT

The lock plug can have a plug body rotatably mountable within a lock housing for rotation around an axis, the plug body having a solid of revolution shape, the plug body having an insert component assembled to a primary component, a keyway defined in the plug body, the keyway having a length parallel to the rotation axis, the keyway adapted to receive a key blade matching a cross-sectional shape of the keyway, and a blocking mechanism protruding into the keyway, the blocking mechanism configured to prevent the plug from rotating unless actuated by the key blade and unless the key blade is of a matching type, the blocking mechanism integrated to the plug insert. The method of assembling the lock plug can include assembling components of the blocking mechanism to the insert component prior to assembling the insert component to the primary component.

20 Claims, 8 Drawing Sheets

(56) References Cited

U.S. PATENT DOCUMENTS

| | | | | |
|---|---|---|---|---|
| 4,953,373 | A | 9/1990 | Toledano | |
| 5,070,715 | A | 12/1991 | Smallegan et al. | |
| 5,479,800 | A | 1/1996 | Myers | |
| 5,615,565 | A | 4/1997 | Field | |
| 5,615,566 | A | 4/1997 | Brandt | |
| 5,752,400 | A | 5/1998 | Kim | |
| 5,819,566 | A | 10/1998 | Eden | |
| 5,819,567 | A | 10/1998 | Eden | |
| 5,823,030 | A | 10/1998 | Theriault et al. | |
| 6,112,565 | A | 9/2000 | Aramburu | |
| 6,508,091 | B1 | 1/2003 | Donatini | |
| 6,526,791 | B2 | 3/2003 | Shvarts | |
| 6,718,807 | B2 | 4/2004 | Andersson | |
| 6,758,074 | B1 | 7/2004 | Prunbauer | |
| 6,981,396 | B1 | 1/2006 | Kim | |
| 7,681,425 | B2 | 3/2010 | Teixeira | |
| 8,186,194 | B2 | 5/2012 | Field et al. | |
| 8,448,485 | B1 | 5/2013 | Bo | |
| 9,587,415 | B2 | 3/2017 | Walls et al. | |
| 10,125,519 | B1 | 11/2018 | Gengler et al. | |
| 12,077,984 | B2 | 9/2024 | Clifford et al. | |
| 2002/0104346 | A1 | 8/2002 | Field et al. | |
| 2003/0024287 | A1 | 2/2003 | Field et al. | |
| 2005/0061043 | A1 | 3/2005 | Widen | |
| 2005/0172688 | A1 | 8/2005 | Widen | |
| 2006/0230797 | A1 | 10/2006 | Strong et al. | |
| 2007/0051146 | A1 | 3/2007 | Recondo Carayalde et al. | |
| 2008/0078224 | A1 * | 4/2008 | Wheatland | E05B 27/005 70/491 |
| 2008/0223097 | A1 | 9/2008 | Field et al. | |
| 2008/0250830 | A1 | 10/2008 | Field et al. | |
| 2008/0307841 | A1 * | 12/2008 | Huang | E05B 29/004 70/491 |
| 2009/0078012 | A1 * | 3/2009 | Huang | E05B 29/004 70/491 |
| 2009/0165514 | A1 | 7/2009 | Fredriksson et al. | |
| 2009/0241620 | A1 | 10/2009 | Field et al. | |
| 2010/0031716 | A1 | 2/2010 | Teixeira | |
| 2010/0083718 | A1 | 4/2010 | Miyake | |
| 2010/0101288 | A1 * | 4/2010 | Huang | E05B 27/005 70/490 |
| 2011/0252846 | A1 | 10/2011 | Hertel et al. | |
| 2012/0240645 | A1 | 9/2012 | Mathachan | |
| 2012/0240646 | A1 | 9/2012 | Herrmann | |
| 2013/0086957 | A1 * | 4/2013 | Emory | E05B 29/0066 70/492 |
| 2013/0086958 | A1 * | 4/2013 | Emory | E05B 29/0046 70/357 |
| 2014/0190223 | A1 | 7/2014 | Field et al. | |
| 2014/0223977 | A1 | 8/2014 | Wu et al. | |
| 2015/0240525 | A1 | 8/2015 | Walls et al. | |
| 2016/0376815 | A1 | 12/2016 | Baver | |
| 2017/0081880 | A1 | 3/2017 | Artsiely | |
| 2018/0355642 | A1 | 12/2018 | Cumbo et al. | |
| 2020/0190855 | A1 | 6/2020 | Lai | |
| 2023/0082003 | A1 | 3/2023 | Clifford et al. | |
| 2024/0159081 | A1 | 5/2024 | Clifford et al. | |
| 2025/0027333 | A1 | 1/2025 | Viklund | |

FOREIGN PATENT DOCUMENTS

| | | | | |
|---|---|---|---|---|
| DE | 0507106 | C | 9/1930 | |
| DE | 10050460 | A1 | 4/2002 | |
| DE | 10208893 | C1 | 8/2003 | |
| EP | 1662077 | A1 | 5/2006 | |
| EP | 2700775 | A2 | 2/2014 | |
| EP | 2770139 | A2 | 8/2014 | |
| EP | 3366870 | A1 | 8/2018 | |
| EP | 3366871 | A1 | 8/2018 | |
| EP | 3375956 | A1 | 9/2018 | |
| JP | 2008267134 | A * | 11/2008 | E05B 29/004 |
| JP | 2011522984 | A * | 8/2011 | E05B 27/005 |
| WO | 96/41929 | A1 | 12/1996 | |
| WO | 97/11244 | A1 | 3/1997 | |
| WO | 99/49161 | A1 | 9/1999 | |
| WO | WO-2009008852 | A1 * | 1/2009 | E05B 27/005 |
| WO | 2014/005568 | A1 | 1/2014 | |
| WO | 2014/005569 | A2 | 1/2014 | |
| WO | 2014/071916 | A2 | 5/2014 | |
| WO | 2014/165949 | A1 | 10/2014 | |
| WO | 2017/157586 | A1 | 9/2017 | |
| WO | 2019/020944 | A1 | 1/2019 | |
| WO | WO-2022204154 | A1 * | 9/2022 | E05B 15/1614 |

OTHER PUBLICATIONS

Espacenet machine translation of WO 96/41929 A1. (Year: 2024).

Final Office Action mailed on Dec. 3, 2024, for U.S. Appl. No. 17/475,091, pp. 28.

Non-Final Office Action mailed on Apr. 25, 2024, for U.S. Appl. No. 17/475,091, pp. 30.

Non-Final Office Action mailed on Apr. 29, 2024, for U.S. Appl. No. 18/417,294, pp. 28.

Restriction Requirement mailed on Mar. 22, 2024, for U.S. Appl. No. 17/475,091, pp. 5.

U.S. Office Action issued in corresponding U.S. Appl. No. 18/224,969, issued Dec. 27, 2024. (8 pages).

* cited by examiner

PLUG FOR LOCK SYSTEM AND ASSOCIATED METHOD OF ASSEMBLY

BACKGROUND

The plug of a lock is the part of the lock which has the keyway and which rotates when actuated by the rotation of a correct key which is fully engaged in the keyway. It is typically generally cylindrical, and may have other solid-of-revolution shapes or some solid-of-revolution shaped details.

Modern lock systems may have a plurality of security features. For instance, the keyways have relatively complex cross-sectional shapes, and exclude keys which do not have a matching cross-sectional shape. A locking mechanism, typically having a number of biased components referred to as tumblers, is typically also integrated to modern lock systems. The tumblers are biased into the keyway and interfere with the rotation of the plug unless all of them are pushed by just the right distance, which occurs when a key having a key blade with a matching edge profile (i.e. a matching key) is fully engaged into the keyway. In practice, many lock systems use tumbler configurations which can be operated by a very limited number of more than one matching edge profile, such as a master key adapted to open a number of different locks at premises and a unit key specific to the lock of a given unit of the premises. Modern lock systems may additionally have yet a third security feature in the form of a blocking mechanism. The blocking mechanism can also interfere with the rotation of the plug, but rather than allowing rotation contingent upon a matching edge profile, it can allow rotation contingent upon the key blade being of a given key blade type. The key blade types include a plurality of keys having different edge profiles but having a corresponding feature, such as a particular longitudinal abutment location.

An example of a blocking mechanism is presented in published U.S. application publication no. 2023/0082003, the contents of which are hereby incorporated. This example blocking mechanism includes a tumbler which pivots a rocker in a manner to unblock the rotation of the plug when pushed by just the right amount by a longitudinal abutment formed in a side of the key blade. Different key types can have abutments at different locations along the length of the blade, and keys of types other than the matching key type may not push the blocking mechanism tumbler enough, or push it too much, preventing the rocker from unblocking the rotation of the plug. Other blocking mechanism configurations may exist, and blocking mechanisms can be differentiated from locking mechanisms due to the fact that they discriminate between types of keys rather than between edge profiles. Another example is presented in U.S. application Ser. No. 18/224,969, the contents of which are hereby incorporated by reference.

While existing locks and plugs therefore have met commercial success and have shown suitable to a certain degree, there always remains room for improvement. In particular, there can be manufacturing challenges, such as may pertain to machining of components or assembly of components, which may affect the design of blocking mechanisms, and controlling production costs is a constant concern of lock manufacturers.

SUMMARY

It was found that integrating components of the blocking mechanism in an insert component rather than in the primary component of the plug could provide enhanced satisfaction at least in some embodiments. The insert component can be assembled or can be disassembled from the primary component. In particular, it may be easier to machine features forming part of or cooperating with components of a blocking mechanism in an insert component than directly in a primary component. It may be easier or less costly to repair or replace blocking mechanism components if integrated in an insert component than if integrated in a primary component. It may be easier or less costly to assemble blocking mechanism components if integrated in an insert component than if integrated in a primary component. There may be other advantages to integrating components of a blocking mechanism in an insert component rather than in the primary component.

In accordance with one aspect, there is provided a lock plug configured to be rotatably mounted in a lock housing, the lock plug comprising: a plug body rotatably mountable within the lock housing for rotation relative the lock housing, around an axis, the plug body having a solid of revolution shape, the plug body having a insert component assembled to a primary component; a keyway defined in the plug body, the keyway having a length parallel to the rotation axis, the keyway adapted to receive a key blade matching a cross-sectional shape of the keyway; and a blocking mechanism protruding into the keyway, the blocking mechanism configured to prevent the plug from rotating unless actuated by the key blade and unless the key blade is of a matching type, the blocking mechanism integrated to the plug insert.

In accordance with another aspect, there is provided a modular lock plug configured to be rotatably mounted in a lock housing, the lock plug comprising: a plug body rotatably mountable within the lock housing for rotation relative to the lock housing around a rotation axis, the plug body having a solid of revolution shape, the plug body comprising an insert component assembled to a primary component; a keyway defined in the plug body, the keyway having a length parallel to the rotation axis, the keyway adapted to receive a key blade matching a cross-sectional shape of the keyway; and a blocking mechanism operable to protrude into the keyway, the blocking mechanism configured to prevent the plug from rotating unless actuated by the key blade, the blocking mechanism integrated into the plug body insert component; wherein the insert component is selected from a plurality of insert components each corresponding to at least one of a plurality of key blades, each insert component interchangeable with another insert component.

It may be provided that the plug body has a cylindrical shape concentric with the axis and a length extending parallel the axis, the length between a front end and a rear end, the keyway opening at the front end, the plug insert generally shaped as a segment of the cylindrical shape, the segment having a height extending radially relative the axis, the height lesser than a radius of the cylindrical shape, the segment having a portion of the length of the plug body.

It may be provided that the insert has a first transversal engagement surface extending transversally to the height and along the length, the plug body has a second transversal engagement surface, the first transversal engagement surface mating with the second transversal engagement surface and engaged with the second transversal engagement surface.

It may be provided that the first transversal engagement surface and the second transversal engagement surface are straight in the axial orientation and curved in the transversal orientation.

It may be provided that a retaining ring secures the insert component to the primary component, the retaining ring concentric to the axis.

It may be provided that the insert component and the primary component have axially abutting surfaces.

It may be provided that one of the insert component and the primary component has at least one axially oriented male member protruding from the corresponding axially abutting surface, and the other one of the insert component and the primary component has at least one axially oriented female member recessed in the corresponding axially abutting surface, the at least one male member axially engaged with the at least one female member.

It may be provided that the blocking mechanism has a tumbler biased towards the key blade and configured to engage and be pushed back by a cam of the key blade, the mechanism unblocking the rotation when pushed back by an unblocking distance.

It may be provided that the blocking mechanism has a rack integrated to the tumbler, and a pinion rotatable by the rack around a pinion axis to selectively block or unblock the rotation of the lock plug.

The lock plug may be rotatably housed in the lock housing.

A sleeve may extend around the lock plug, between the lock plug and the lock housing.

It may be provided that the lock housing further comprises a locking mechanism having tumblers disposed along the length of the keyway, the tumblers biased into the keyway, the locking mechanism configured to prevent the plug from rotating unless activated by a key blade having a matching edge pattern.

The lock plug may be rotatably mounted within a case of a lock core, the lock core being of the small format interchangeable core (SFIC) format configured to be engaged within a corresponding opening formed in a lock housing.

In accordance with another aspect, there is provided a method of assembling a lock plug, the method comprising: assembling components of a blocking mechanism to an insert component partially defining a keyway; and assembling the insert component to a primary component of the lock plug to form a plug body, the primary component partially defining the keyway, the plug body having a solid of revolution shape defined around an axis, the plug insert generally shaped as a segment of the solid of revolution shape, the segment having a height lesser than a radius of the solid of revolution shape around the axis.

It may be provided that said assembling the insert component to the primary component includes abutting a first transversal engagement surface of the insert component against a second transversal engagement surface of the primary component and sliding the insert component along a length of the keyway until a first axial engagement surface of the insert component abuts a second axial engagement surface of the primary component, and then securing the insert component to the primary component.

It may be provided that the first transversal engagement surface has at least one axially oriented male member protruding from the surface and the second transversal engagement surface has at least one axially oriented female member recessed in the surface, the at least one male member axially engageable with the at least one female member.

It may be provided that the blocking mechanism is a first blocking mechanism and the insert component is a first insert component, further comprising assembling components of a second blocking mechanism to a second insert component, a geometry of the second blocking mechanism differing from a geometry of the first blocking mechanism, further comprising, prior to said assembling the first insert component to the primary component, selecting the first insert component based on the geometry of the first blocking mechanism.

It may be provided that the first blocking mechanism differs from the second blocking mechanism in that it is configured to match a key blade of a different type.

The method may further include rotatably mounting the lock plug within a mating recess of a lock housing, further comprising engaging a key blade of a matching type in the keyway, the key blade disengaging the blocking mechanism, thereby allowing the rotation of the lock plug, and rotating the lock plug in the housing by rotating the key blade.

It may be provided that the key blade disengaging the blocking mechanism includes a ram defined in a side of the key blade pushing a tumbler of the blocking mechanism towards a rear of the lock plug until a shoulder of the key blade abuts a front of the lock plug and the tumbler of the blocking mechanism reaches an unblocking position.

It may be provided that the key blade has an edge profile matching a locking mechanism configuration of the lock housing, the key blade further disengaging the locking mechanism, thereby allowing the rotation of the lock plug.

All technical implementation details and advantages described with respect to a particular aspect of the present invention are self-evidently mutatis mutandis applicable for all other aspects of the present invention.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
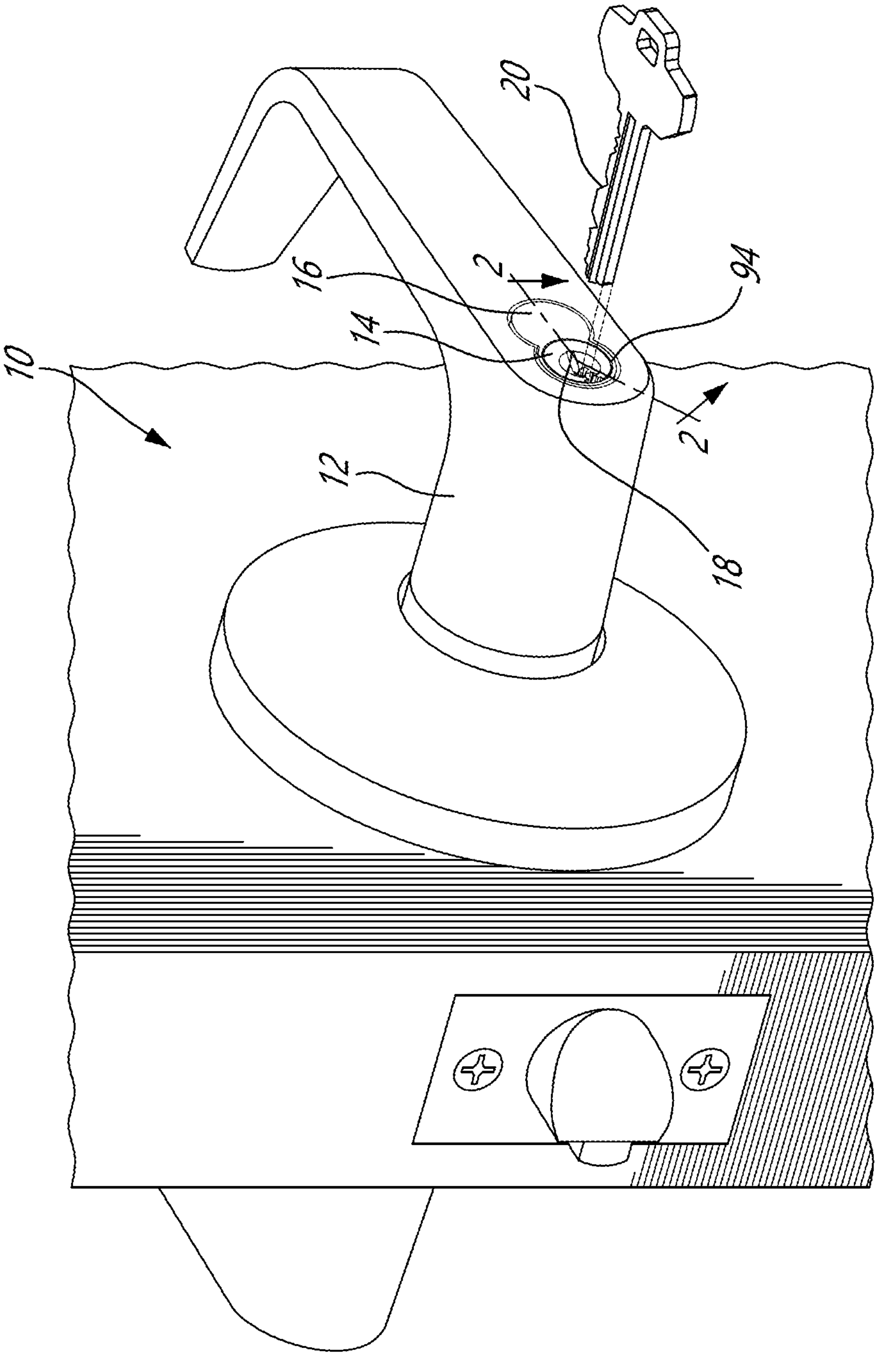
FIG. 1 is a view of an example of a lock.

FIG. 1 shows an example of a lock 10. In this example, the lock has a lock housing 12 in the form a lever handle and a lock plug 14 rotatably mounted in the lock housing 12. In this specific example, the lock plug 14 is integrated to a small format interchangeable core 16 (SFIC) which is removable from the housing 14, and can be seen to have the characteristic “FIG. 8” shape. Accordingly, the lock plug 14 can be said to be indirectly mounted to the lock housing 12, via a case 94 of the small format interchangeable core 16. It will be noted here that this example lock context is but one of numerous potential embodiments of locks into which a lock plug can be rotatably mounted in a lock housing, and several other examples will be presented further below, including some where the lock plug is directly and/or more permanently received in the lock housing. Accordingly, this disclosure should thus not be considered to be limited in scope to lever type housings or to the context of small format interchangeable cores.

The lock 10 in this example is configured to provide access when the lock plug 14 rotates in the housing 12. The lock 10 may have a plurality of safety features which may prevent undesired rotation of the lock plug 14. In this example, the lock plug 14 has a keyway 18 which has a particular cross-sectional shape, and which prevents keys with key blades 20 having non-matching cross-sectional shapes from even entering the keyway 18.

Figure 2:
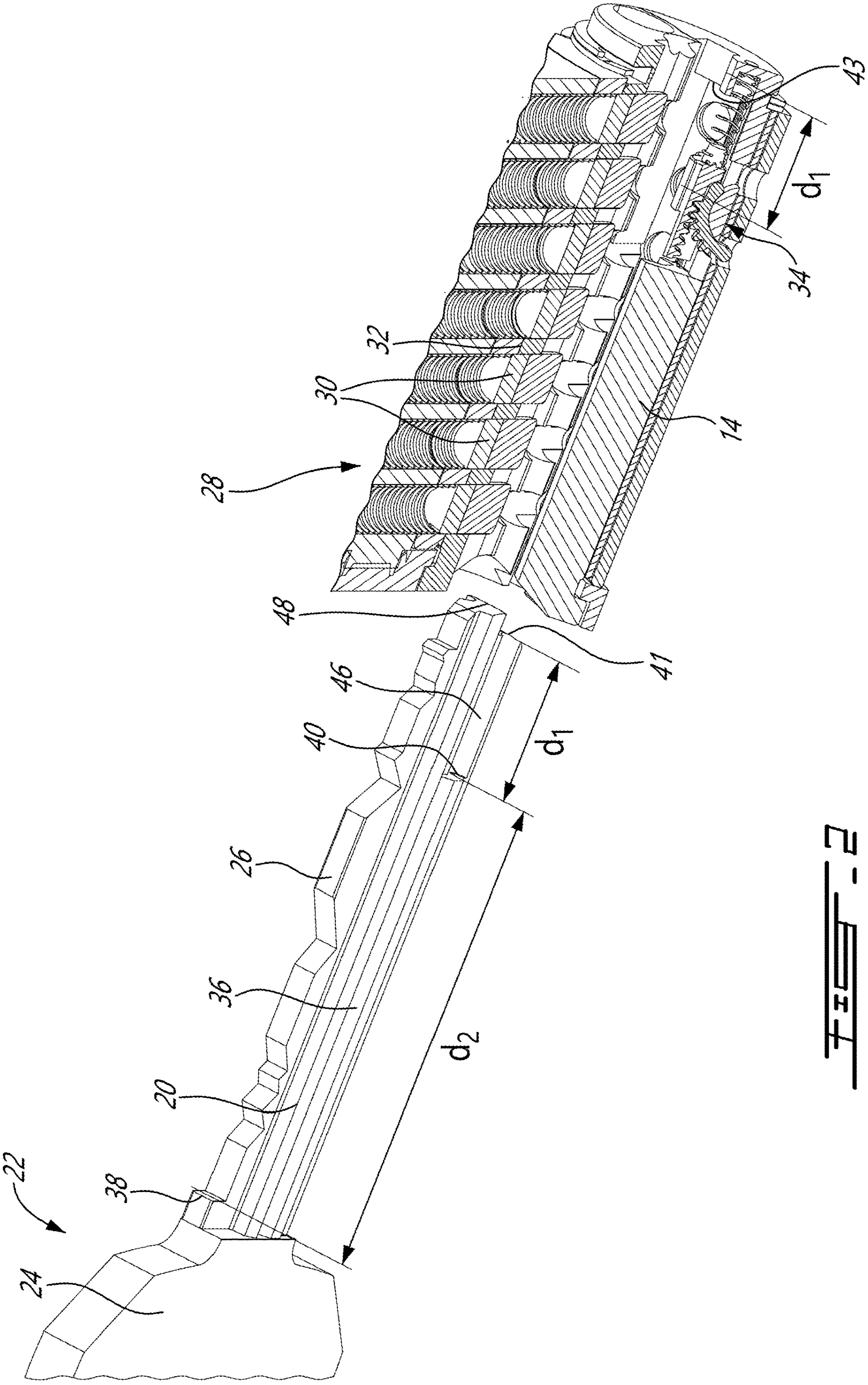
FIG. 2 is a cross-sectional view, partly fragmented, taken along lines 2-2 of FIG. 1.
Figure 3:
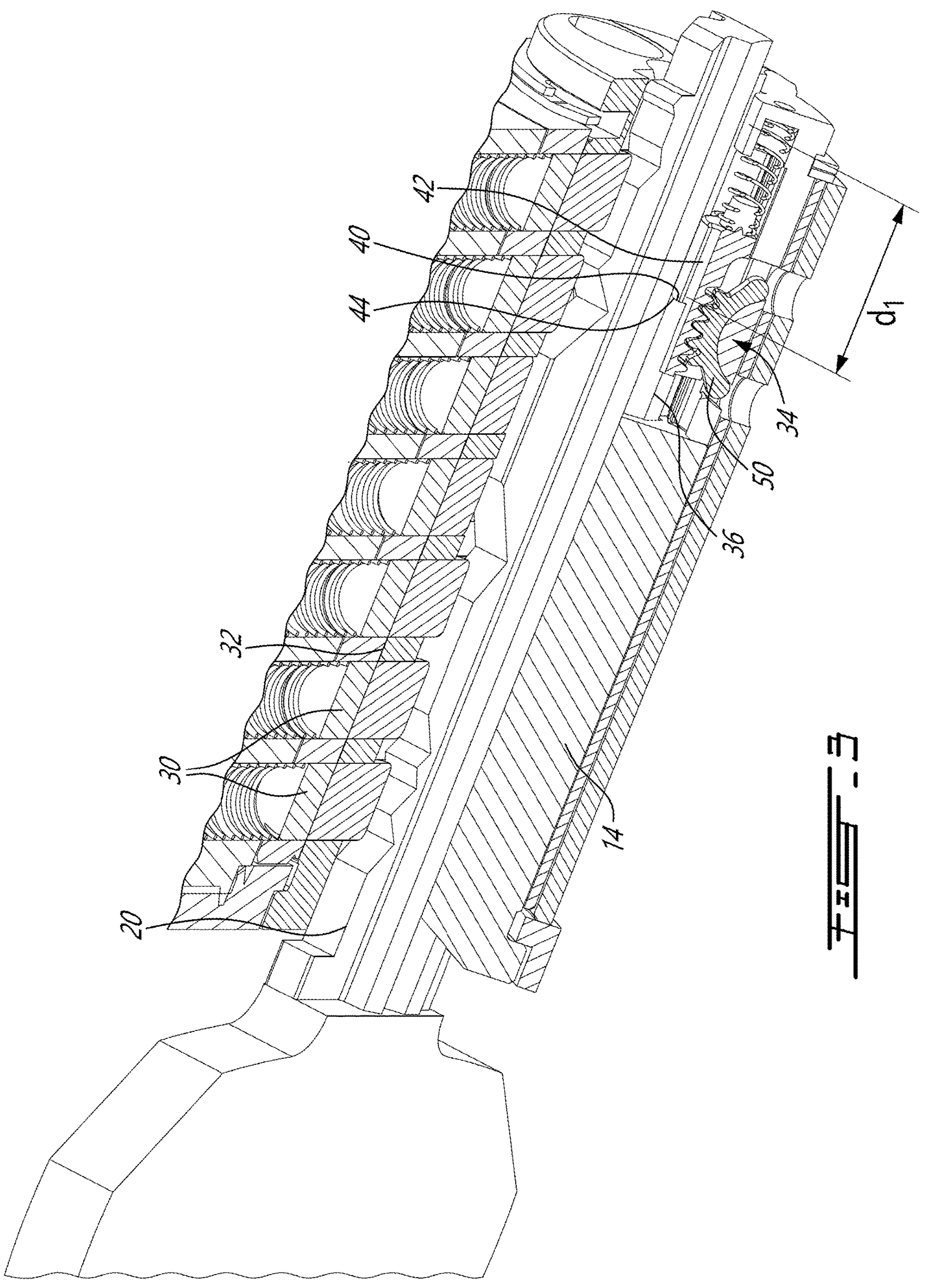
FIG. 3 is a view similar to FIG. 2, where the key blade is shown engaged in the keyway.

FIGS. 2 and 3 present cross-sectional, fragmented views showing the engagement between a key blade 20 having a matching type and a matching edge profile with the lock plug 14. Referring to FIG. 2, a key 22 can have a key bow 24 which serves as a handle for the key 22, and a key blade 20 (also known as a key shank). The key blade 20 has a length which is relatively flat and has two transversally opposite edges and two transversally opposite faces. An edge profile 26 in the form of longitudinally-varying widths is defined along the length of one of the edges. The lock 10 can have a locking mechanism 28 which includes a plurality of tumblers 30 which are pushed more or less in corresponding cylinders depending on the configuration of the edge profile 26 at each particular longitudinal location. Only when the edge profile matches the hidden configuration of the tumblers 30 do separations in components of the tumblers 30 (e.g. pins) coincide with the edge 32 of the lock plug 14, which allows the lock plug 14 to rotate. When even one of the tumblers 30 is not pushed outwardly to the correct position, it will block the rotation of the lock plug 14 and prevent the lock 10 from opening. In this example, the number of different combinations, or edge profile configurations, possible for a given type of key can depend on the number of tumblers 30 forming part of the locking mechanism 28, whether the tumblers 30 have a single point of separation or multiple points of separation, and the number of different allowable positions for each tumbler. There can be a relatively large number of edge profiles which do not match the tumbler configuration for an edge profile which matches the tumbler configuration, making it highly unlikely for an incorrect key to randomly match the tumbler configuration of a given lock. Other types of locking mechanisms exist and may be used in alternate embodiments.

In the embodiment illustrated, the lock 10 further has a blocking mechanism 34 which prevents keys of a wrong key type from opening the lock 10, even if it has a cross-sectional shape matching the cross-sectional shape of the keyway 18 and a matching edge profile. In the embodiment illustrated, the key type is defined by longitudinal position of an abutment 40 relative to a length of the key. Depending on the approach associated to a particular key manufacturer, the longitudinal position may need to be set with a relatively high degree of precision, and can be defined as a longitudinal distance between the abutment 40 and another stop feature of the key. For instance, in one embodiment, a stop 41 may be defined near the tip 48 of the key 22 and configured to come into abutment, when in the fully engaged position, with a corresponding stop 43 defined at the rear end of the plug 14, in which case longitudinal position of the abutment 40 can be defined as the longitudinal distance di between the abutment 40 and the stop 43. In another embodiment, a shoulder 38 may be defined near the bow 24 of the key 20 and configured to come into abutment, when in the fully engaged position, with a front face of the lock plug 14, in which case the longitudinal position of the abutment 40 can be defined as the longitudinal distance d2 between the abutment 40 and the shoulder 38. In the specific example illustrated, the abutment 40 is embodied as the longitudinal tip of a longitudinally extending bulge 36 formed in a face of the key blade 22, and the longitudinal position of the abutment 40 can be set by cutting out a longitudinal groove 46 from the tip to the longitudinal location, removing the bulge 36 along a portion of the length of the key blade 20, allowing the bulge 36 to act as a ram, but many different approaches to forming the abutment may be used in alternate embodiments. It will be noted that this is but one example, and depending on the details of the blocking mechanism 34, key types may further be defined by the cross-sectional shape or cross-sectional size of the ram or abutment 40, for instance. In some embodiments, a very limited number of more than one key type, such as two key types for instance, may correctly trigger the blocking mechanism, while all other key types will not.

In the specific example illustrated, as shown in FIG. 3, the blocking mechanism includes a tumbler 42 which is longitudinally-oriented by contrast with the transversally-oriented tumblers 30 of the locking mechanism 28. The tumbler 42 is configured to be pushed by the abutment 40, and may further be configured to be engaged by the abutment 40 when a mating portion 44 thereof matches the configuration (e.g. size and shape) of a longitudinal groove 46 (see FIG. 2) defined in the face of the key blade 20 between the abutment 40 and the tip 48 of the key blade 20. In this example, the tumbler 44 is spring biased and is biased to a first blocking position shown in FIG. 2 when not pushed by the abutment 40 of a matching key type. When pushed by the abutment 40 of a matching key type, the tumbler 42 rotates a blocking component 50 via a rack and pinion engagement into the position shown in FIG. 3, freeing the lock plug 14 from the blocking action of the blocking mechanism 34. Blocking mechanism 34 is more fully described and illustrated in pending U.S. application Ser. No. 18/224,969. Other types of blocking mechanisms exist and may be used instead of the one shown in this example in alternate embodiments, such as the one described in published U.S. application publication number 2023/0082003 for instance, which operates on the basis of the rocking of a rocker rather than the rotation of a pinion.

It will be understood based on the description presented above, that independently of the detail of their construction, blocking mechanisms may include relatively small components having relatively complex geometries. This is particularly the case for blocking mechanisms incorporated into small format interchangeable cores, but may also be the case for blocking mechanisms incorporated into large format interchangeable cores, or in blocking mechanisms incorporated into lock plugs directly and permanently incorporated into lock housings. Accordingly, blocking mechanisms integrated to lock plugs may pose manufacturing challenges, such as machining challenges and/or assembly challenges, which may affect the cost and/or functionality of a given lock.

It was found that at least in some embodiments, it could be more suitable to provide the lock plug 14 in the form of an assembly of a primary component 52 and of an insert component 54, where components of the blocking mechanism 34 are integrated to the insert component 54. An example of such an embodiment is presented in FIG. 4.

Figure 4:
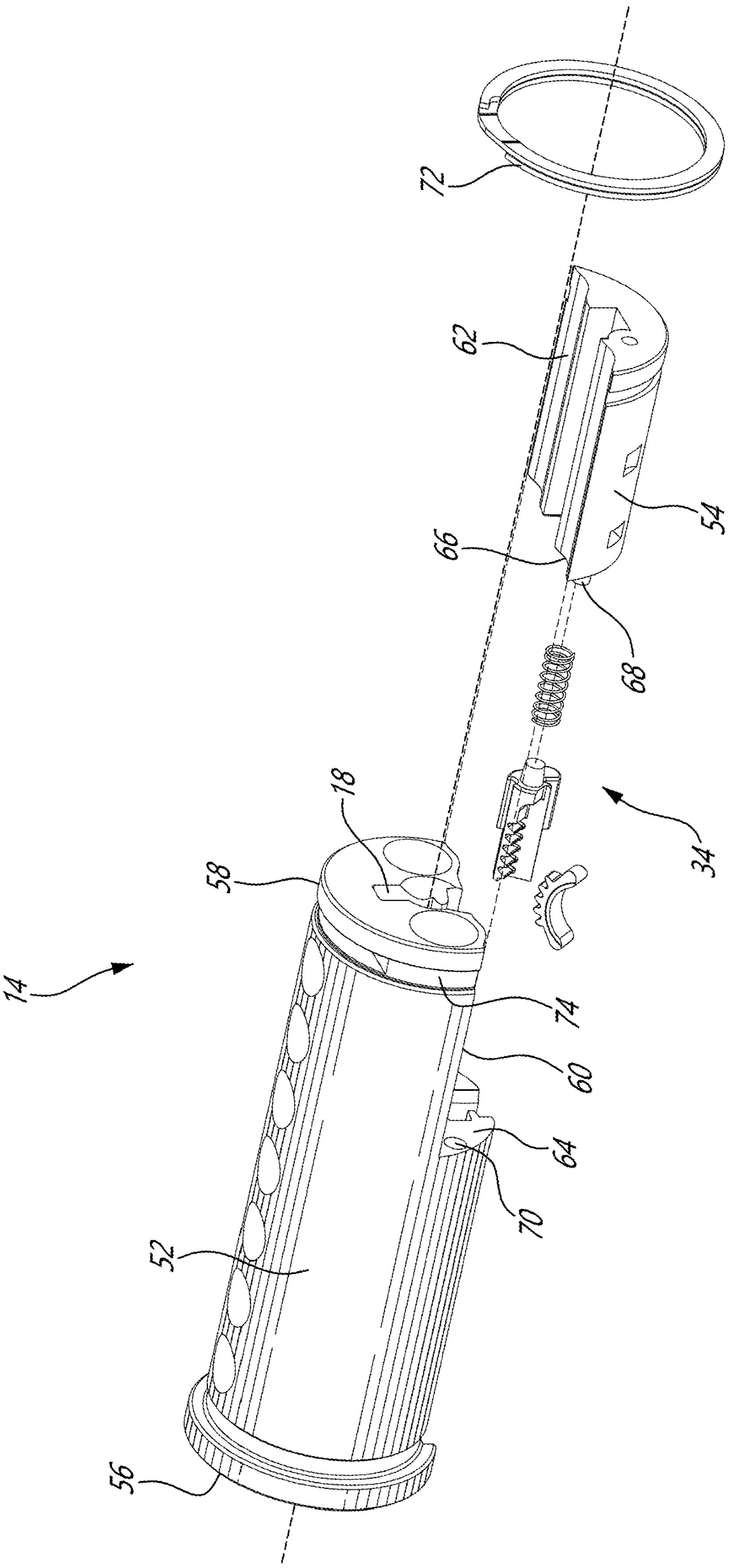
FIG. 4 is an exploded view of a lock plug in accordance with an example.

In the example presented in FIG. 4, the insert component 54 is significantly smaller than the primary component 52 to which it is assembled to form the lock plug 14. In this example, the lock plug 14 is of a generally cylindrical shape, with the exception of annular ridges and grooves, and some apertures such as pin tumbler apertures or blocking element apertures. While the geometry of the lock plug 14 can vary in alternate embodiments, it will typically involve a generally solid-of-revolution shape which may collaborate in providing smooth rotatability in the housing (when the locking mechanism 28 and the blocking mechanism 34 are disengaged by a matching key). The insert component 54 can form a portion of the solid-of-revolution shape of the lock plug 14. In this example, the lock plug 14 has a front end 56 where the opening to the keyway 18 is, and a rear end 58 opposite the front end 56. The insert component 54 can occupy a portion of the volume of the solid of revolution shape at the rear end 58, for instance. In this example, the insert component 54 generally has a cylindrical segment shape having a height which is lesser than a radius of the generally cylindrical shape, and a length extending along only a minor portion (i.e. less than half) of the length of the lock plug 14, from the rear end 58. Components of the blocking mechanism 34 can be manufactured separately from the insert component 54, and assembled to the insert component 54 before positioning the insert component 54 into its assembled position against the primary component 52.

In this example, the fitting of the insert component 54 with the primary component 52 is guided by four main features: mating transversal engagement surfaces 60, 62, mating axial engagement surfaces 64, 66, a male member 68 and female member 70 engagement and a ring 72 and groove 74 engagement. Indeed, in this example, the insert component 54 has a first transversal engagement surface 62 which is generally horizontally oriented, and the primary component 52 has a second transversal engagement surface 60 which has a matching shape and is also generally horizontally oriented. The engagement between these two engagement surfaces stops the transversal relative displacement of the insert component 54 towards the primary component 52. Moreover, in this example, the insert component 54 has a first axial engagement surface 66 which is generally vertically oriented, and the primary component 52 has a second axial engagement surface 64 which has a matching shape and is also generally vertically oriented. The engagement between these two engagement surfaces stops the axial relative displacement of the insert component 54 towards the primary component 52.

In addition to these two sets of matching surfaces which may, in some embodiments, be sufficient to correctly locate the insert component 54 relative the primary component 52, two additional features are used in this embodiment. Firstly, a male member 68 and female member 70 engagement, including at least one male member 68 axially protruding from one of the first axial engagement surface 66 and the second axial engagement surface 64, and at least one mating female member 70 axially recessed into the other one of the first axial engagement surface 64 and the second axial engagement surface 66. Secondly, in this embodiment, the insert component 54 is held into position against the primary component 52 by a retaining ring 72 engaged in a groove 74 which partially extends around the primary component 52 and partially extends around the insert component 54, at the rear end 58. In addition to holding the insert component 54 into position in the matching recess formed in the primary component 52, the ring 72 and groove 74 engagement further assists in maintaining the correct relative position between the insert component 54 and the primary component 52. The male member 68 and female member 70 engagement can also cooperate with the ring 72 and groove 74 engagement in holding the insert into position during manipulations of the lock plug 14. In this specific example, two male and female member engagements are provided, one on each side, and the male members 68 are integrated to the insert component 54, but many various alternate embodiments are possible, such as male members integrated into the primary component 52. Moreover, in this example, the transversal engagement surfaces 62, 60 are straight in the axial orientation, but wavy in the transversal orientation, providing additional positioning reference features. An additional function of the male and female engagement is that if the insert component 54 is not correctly transversally aligned relative the primary component 52, the male member(s) will not engage the female member(s), leaving an axial gap between axial engagement surfaces 66, 64 and an offset in the rear faces of the insert component 54 and of the primary component 52, providing the assembler a visual cue that the alignment is incorrect and preventing the engagement of the ring 72 with the groove 74 until the misalignment has been corrected and the insert component 54 fully pushed in.

Figure 5A:
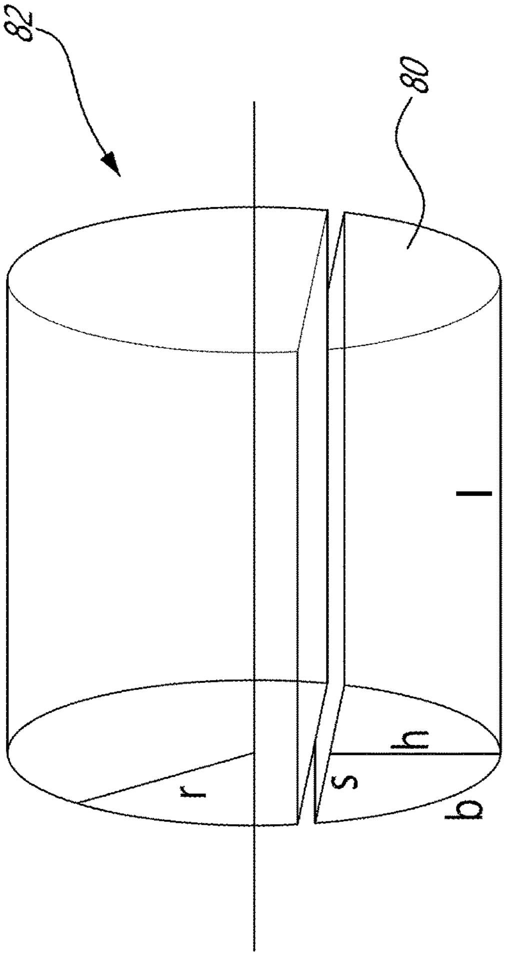
FIGS. 5A, 5B and 5C are schematic views showing a cylindrical segment partitioned from a cylinder, and the difference between a sector and a segment, respectively.
Figure 5B:
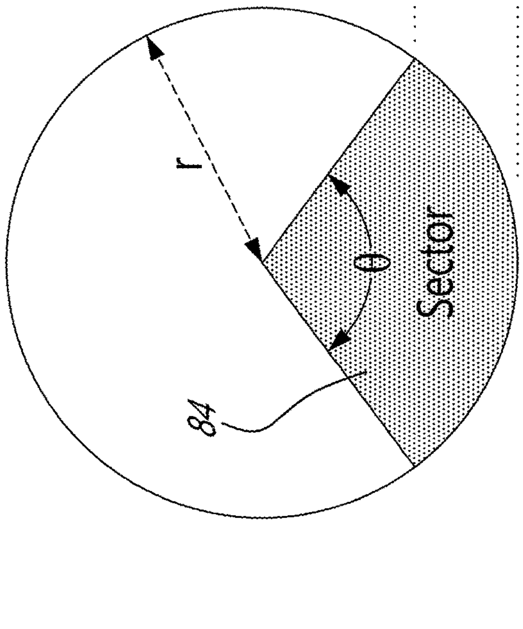
Figure 5C:
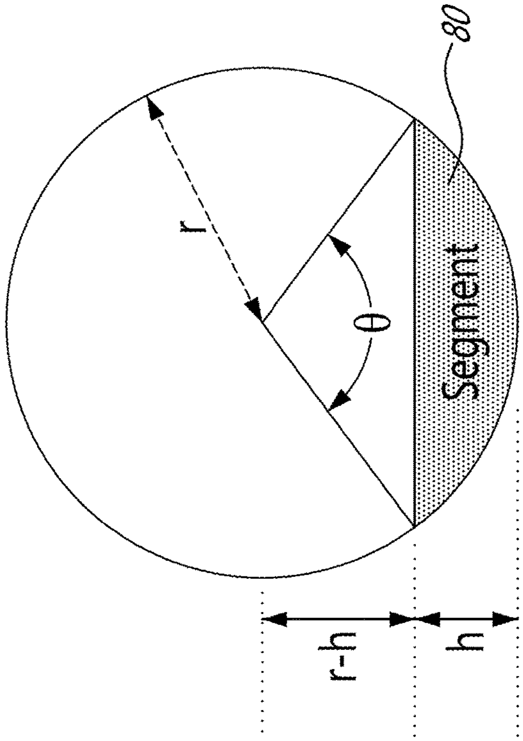

FIGS. 5A to 5C provide schematic illustrations explaining what is meant by a cylindrical segment 80. Indeed, a cylindrical segment 80 is defined as a lateral portion of a cylinder 82 which has a height h which can be smaller than a radius r of the cylinder 82. As opposed to a cylindrical sector 84, schematized in FIG. 5B and which occupies a pie-shaped portion of a cylinder, a cylindrical sector 80, schematized in FIG. 5C, occupies a shape reminiscent of water partially filling a horizontally-oriented cylinder.

Figure 6:
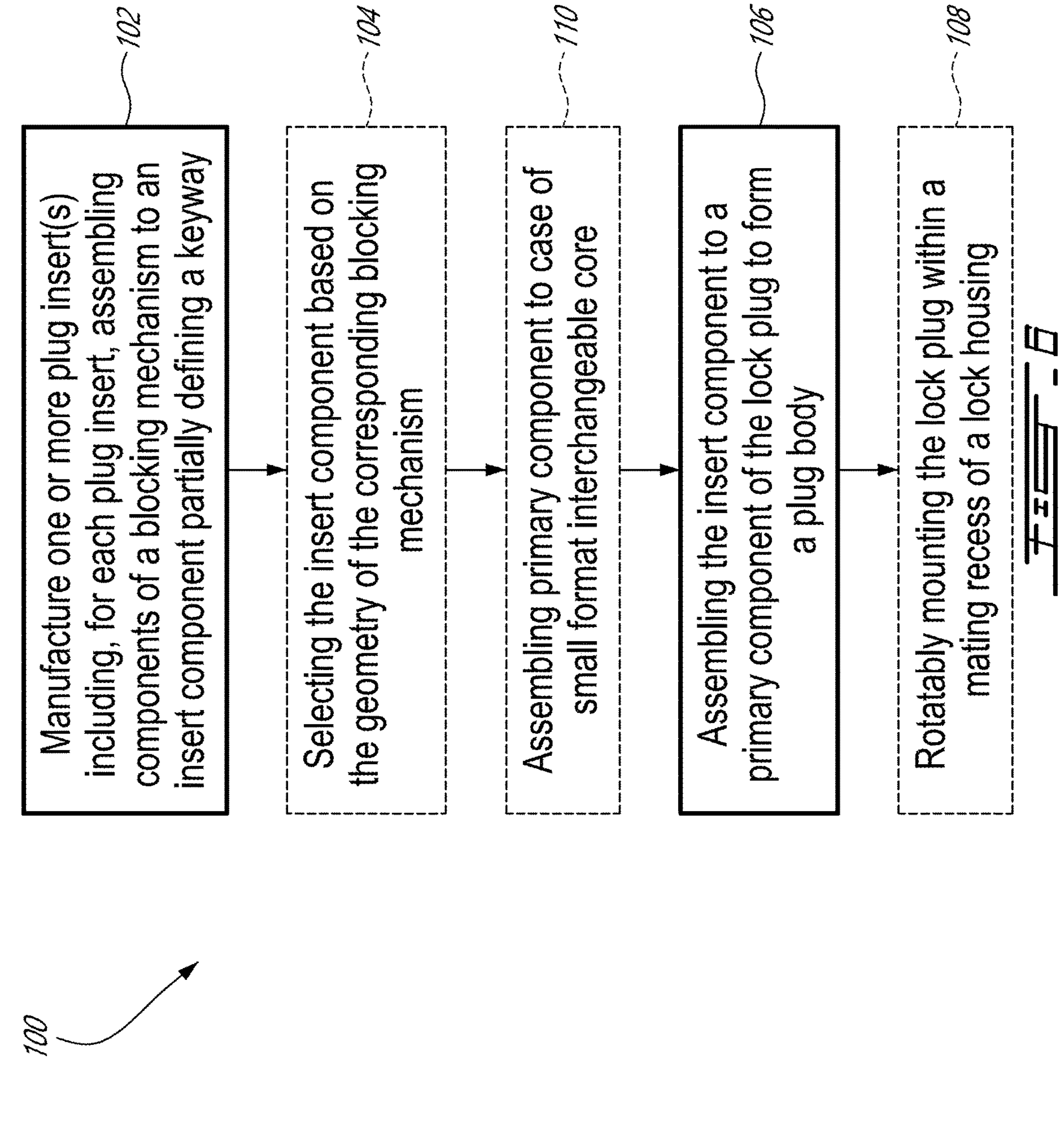
FIG. 6 is a flow chart of a method of assembling a lock plug.

Turning to FIG. 6, it will be understood that a method 100 of assembling a lock plug 14 can include manufacturing one or more plug inserts, including, for each plug insert, assembling components of a corresponding blocking mechanism to an insert component. The insert component can partially define a keyway. The method can further include assembling the plug insert, including the insert component and the assembled components of the corresponding blocking mechanism, to a primary component of the lock plug, to form a plug body. The primary component can define another portion of the keyway and cooperate with the insert to fully define the keyway. When more than one plug insert is provided, different plug inserts may have different blocking mechanisms, where the geometry of the blocking mechanisms can vary from one insert component to another. Different geometries of blocking mechanisms can match different types of keys, for instance. Accordingly, the method 100 can include selecting one of the plug inserts based on the geometry of the blocking mechanism integrated to the insert component, and assembling that insert component to the primary component of the lock plug rather than other insert components bearing blocking mechanisms having different geometries or otherwise matching different types of keys. Once the lock plug has been assembled, it can be rotatably mounted to a mating recess of a lock housing, either indirectly (e.g. via a case of a SFIC), or directly.

When assembling the insert component 54 to the primary component 52, one may first abut the first transversal engagement surface 62 of the insert component 54 against a second transversal engagement surface 60 of the primary component 52, and then slide the insert component 54 along a length of the keyway until a first axial engagement surface 66 of the insert component 54 abuts a second axial engagement surface 64 of the primary component 52. Then, the insert component 54 can be secured to the primary component 52.

Figure 7:
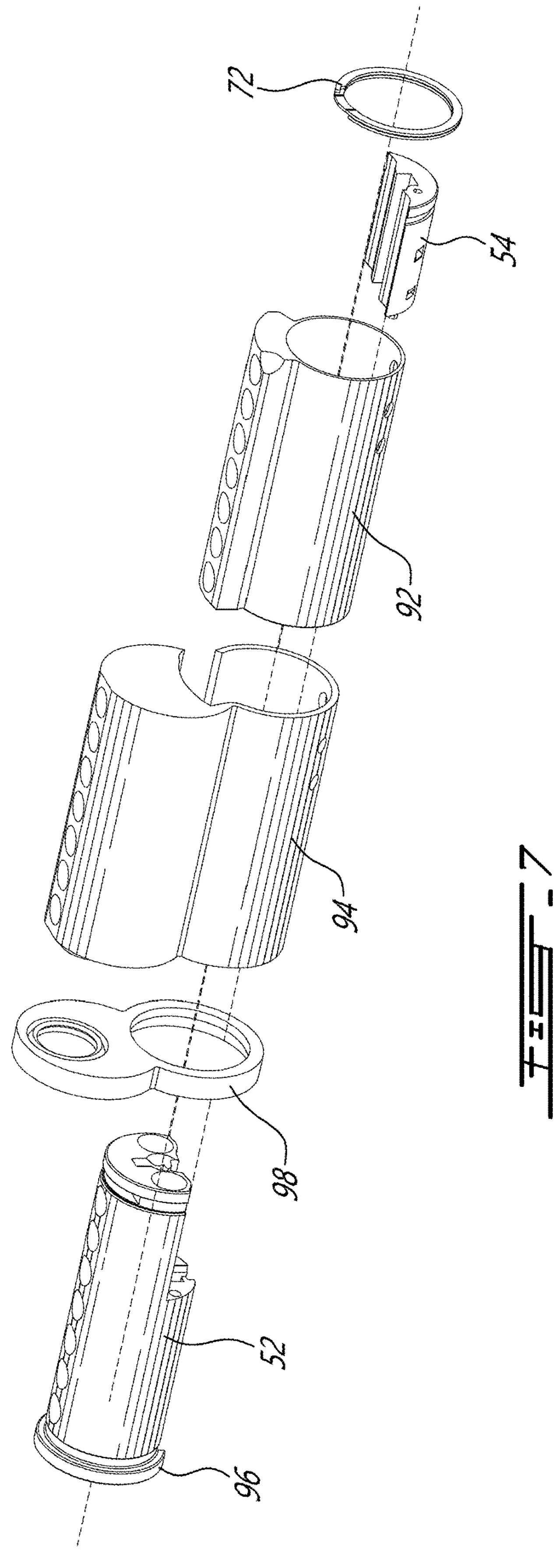
FIG. 7 is an exploded view of an embodiment of a lock plug integrated into a small format interchangeable core.

FIG. 7 presents an example embodiment where the lock plug 14 is integrated as part of a SFIC. More specifically, the lock plug 14, once assembled, can be slid into a sleeve 92 which is itself slid into a case 94. A frontal ridge 96 integrated to the lock plug 14 can sandwich a face plate 98 to the sleeve 92 and case 94, with the ring 72. Depending on the embodiment, the ring 72 can be a C-ring or a full ring, to name two examples. Referring back to the flow chart of FIG. 6, when the lock plug 14 is integrated as part of a SFIC, the primary component 52 can be assembled to a case 94 of the SFIC prior to assembling the insert component 54 to the primary component 52 and placing the ring 72 into the groove 74.

Figure 8A:
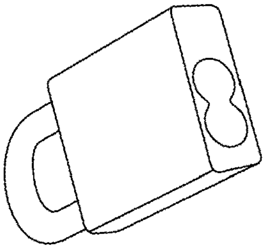
FIG. 8A to 8F present a number of alternate examples of lock housings into which a lock plug may be integrated.
Figure 8B:
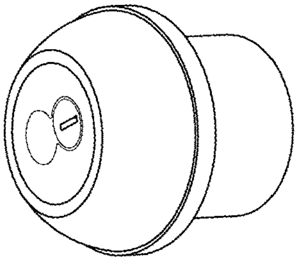
Figure 8C:
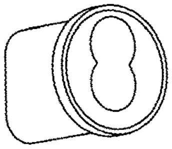
Figure 8D:
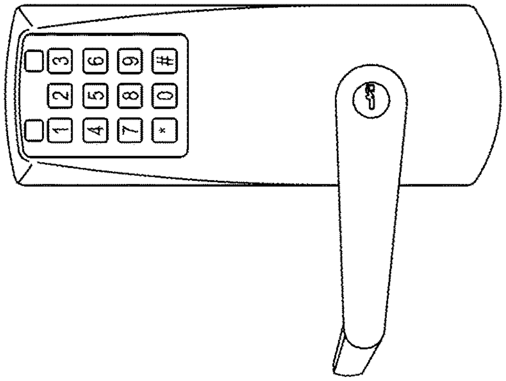
Figure 8E:
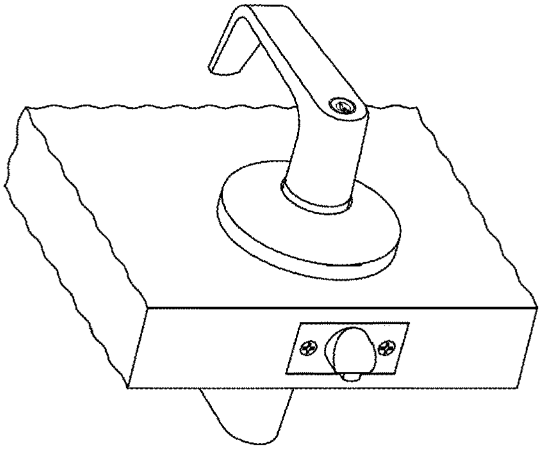
Figure 8F:
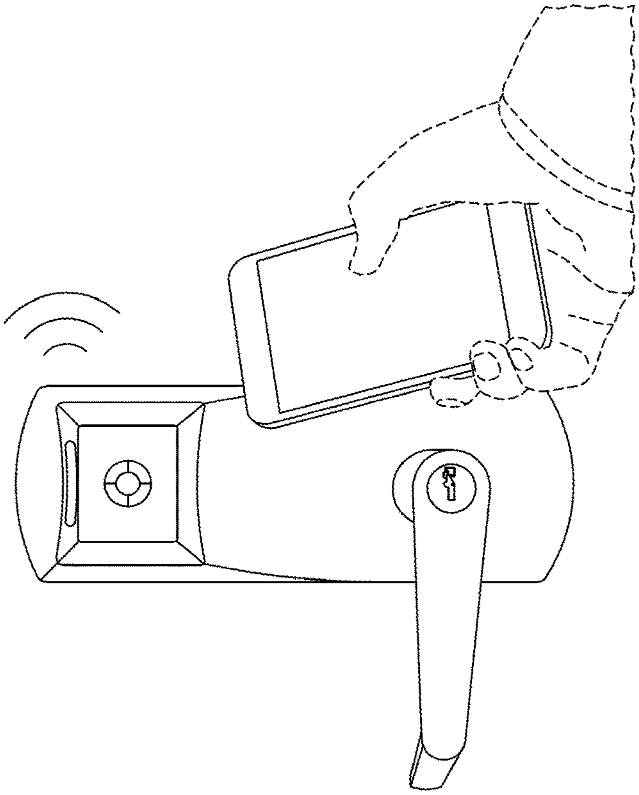

As can be understood, the examples described above and illustrated are intended to be exemplary only. Indeed, while FIGS. 1 and 7 present an example where the lock plug is integrated as part of a SFIC, FIGS. 8D, 8E and 8F present alternate examples where the lock plug is integrated directly and permanently to a lock housing, namely an electronic lock of the keypad type, a handle type lock housing, and an electronic lock of the contact-less activation type, respectively. Moreover, while FIGS. 1, 8D, 8E and 8F present examples where the lock plug is integrated to a handle portion of a lock housing, FIGS. 8A, 8B and 8C present alternate examples of lock housings, namely a padlock, a latchbolt, and a mortise type housings, respectively. The scope is indicated by the appended claims.

What is claimed is:

1. A modular lock plug configured to be rotatably mounted in a lock housing, the lock plug comprising:

a plug body rotatably mountable within the lock housing for rotation relative to the lock housing around a rotation axis, the plug body having a solid of revolution shape, the plug body comprising an insert component assembled to a primary component, wherein a retaining ring secures the insert component to the primary component, the retaining ring concentric to the rotation axis;

a keyway defined in the plug body, the keyway having a length parallel to the rotation axis, the keyway adapted to receive a key blade matching a cross-sectional shape of the keyway; and a blocking mechanism operable to protrude into the keyway, the blocking mechanism configured to prevent the plug from rotating unless actuated by the key blade, the blocking mechanism integrated into the plug body insert component;

wherein the insert component is selected from a plurality of insert components each corresponding to at least one of a plurality of key blades, each insert component interchangeable with another insert component.

2. The lock plug of claim 1 wherein the plug body has a cylindrical shape concentric with the axis and a length extending parallel to the rotation axis, the length between a front end and a rear end, the keyway opening at the front end, the insert component generally shaped as a segment of the cylindrical shape, the segment having a height extending radially relative to the axis, the height lesser than a radius of the cylindrical shape, the segment having a portion of the length of the plug body.

3. The lock plug of claim 2 wherein the insert component has a first transversal engagement surface extending transversally to the height and along the length, the plug body has a second transversal engagement surface, the first transversal engagement surface mating with the second transversal engagement surface.

4. The lock plug of claim 3 wherein the first transversal engagement surface and the second transversal engagement surface are straight in the axial orientation and curved in the transversal orientation.

5. The lock plug of claim 1 wherein the insert component and the primary component have axially abutting surfaces.

6. The lock plug of claim 5 wherein one of the insert component and the primary component has at least one axially oriented male member protruding from the corresponding axially abutting surface, and the other one of the insert component and the primary component has at least one axially oriented female member recessed in the corresponding axially abutting surface, the at least one male member axially engageable with the at least one female member.

7. The lock plug of claim 1 wherein the blocking mechanism has a tumbler biased towards the key blade and configured to engage and be pushed back by an abutment of the key blade, the mechanism unblocking the rotation when pushed back by an unblocking distance.

8. The lock plug of claim 7 wherein the blocking mechanism has a rack integrated to the tumbler, and a pinion rotatable by the rack around a pinion axis to selectively block or unblock the rotation of the lock plug.

9. The lock plug of claim 1 further comprising a sleeve extending around the lock plug, between the lock plug and the lock housing.

10. The lock plug of claim 1 wherein the lock housing further comprises a locking mechanism having tumblers disposed along the length of the keyway, the tumblers biased into the keyway, the locking mechanism configured to prevent the plug from rotating unless activated by a key blade having a matching edge pattern.

11. The lock plug of claim 1 rotatably mounted within a case of a lock core, the lock core being of the small format interchangeable core (SFIC) format configured to be engaged within a corresponding opening formed in the lock housing.

12. A method of assembling a lock plug, the method comprising:

selecting an insert component from a plurality of insert components;

assembling components of a blocking mechanism with the insert component partially defining a keyway; and assembling the insert component to a primary component of the lock plug to form a plug body, the primary component partially defining the keyway, the plug body having a solid of revolution shape defined around an axis, the plug insert component generally shaped as a segment of the solid of revolution shape, the segment having a height lesser than a radius of the solid of revolution shape around the axis;

wherein the assembling the insert component to the primary component includes securing the insert component to the primary component with a retaining ring, the retaining ring concentric to the axis.

13. The method of claim 12 wherein said assembling the insert component to the primary component includes abutting a first transversal engagement surface of the insert component against a second transversal engagement surface of the primary component and sliding the insert component along a length of the keyway until a first axial engagement surface of the insert component abuts a second axial engagement surface of the primary component, and then securing the insert component to the primary component.

14. The method of claim 13 wherein the first transversal engagement surface has at least one axially oriented male member protruding from the surface and the second transversal engagement surface has at least one axially oriented female member recessed in the surface, the at least one male member axially engageable with the at least one female member.

15. The method of claim 12 wherein the blocking mechanism is a first blocking mechanism, further comprising assembling components of a second blocking mechanism to a second insert component selected from the plurality of insert components, a geometry of the second blocking mechanism differing from a geometry of the first blocking mechanism, further comprising, prior to said assembling the first insert component to the primary component, selecting the first insert component based on the geometry of the first blocking mechanism.

16. The method of claim 15 wherein the geometry of the first blocking mechanism differs from the geometry of the second blocking mechanism in that it is configured to match a key blade of a different type.

17. The method of claim 12 further comprising rotatably mounting the lock plug within a mating recess of a lock housing, further comprising engaging a key blade of a matching type in the keyway, the key blade disengaging the blocking mechanism, thereby allowing the rotation of the lock plug, and rotating the lock plug in the housing by rotating the key blade.

18. The method of claim 17 wherein said key blade disengaging the blocking mechanism includes an abutment defined in a face of the key blade pushing a tumbler of the blocking mechanism towards a rear of the lock plug until a stop of the key blade abuts a corresponding stop of the lock plug and the tumbler of the blocking mechanism reaches an unblocking position.

19. The method of claim 17 wherein the key blade has an edge profile matching a locking mechanism configuration of the lock housing, the edge profile further disengaging the locking mechanism, thereby allowing the rotation of the lock plug.

20. A modular lock plug configured to be rotatably mounted in a lock housing, the lock plug comprising:

a plug body rotatably mountable within the lock housing for rotation relative to the lock housing around a rotation axis, the plug body having a solid of revolution shape, the plug body comprising an insert component assembled to a primary component;

a keyway defined in the plug body, the keyway having a length parallel to the rotation axis, the keyway adapted to receive a key blade matching a cross-sectional shape of the keyway; and a blocking mechanism operable to protrude into the keyway, the blocking mechanism configured to prevent the plug from rotating unless actuated by the key blade, the blocking mechanism integrated into the plug body insert component;

wherein the insert component is selected from a plurality of insert components each corresponding to at least one of a plurality of key blades, each insert component interchangeable with another insert component;

wherein the blocking mechanism has a tumbler biased towards the key blade and configured to engage and be pushed back by an abutment of the key blade, the mechanism unblocking the rotation when pushed back by an unblocking distance; and wherein the blocking mechanism has a rack integrated to the tumbler, and a pinion rotatable by the rack around a pinion axis to selectively block or unblock the rotation of the lock plug.

* * * * *